United States Patent [19]
Gripentog

[11] 3,725,661
[45] Apr. 3, 1973

[54] ELECTROMAGNETIC DISTURBANCE NEUTRALIZATION RADIATION DETECTOR

[75] Inventor: William G. Gripentog, Las Vegas, Nev.

[73] Assignee: The United States of America as represented by the United States Atomic Energy Commission

[22] Filed: Sept. 1, 1971

[21] Appl. No.: 177,023

[52] U.S. Cl...........250/83.6 R, 250/83.3 R, 328/162
[51] Int. Cl................................................G01t 1/18
[58] Field of Search...........250/83.6, 83.6 R; 324/33; 328/162

[56] References Cited

UNITED STATES PATENTS

| | | | |
|---|---|---|---|
| 2,874,305 | 2/1959 | Wilson et al. | 250/83.6 R |
| 2,536,617 | 1/1951 | Weller | 250/83.6 R |
| 3,373,284 | 3/1968 | Brown et al. | 250/83.6 R |
| 2,648,015 | 8/1953 | Greenfield et al. | 250/83.6 R |

Primary Examiner—James W. Lawrence
Assistant Examiner—Harold A. Dixon
Attorney—Roland A. Anderson

[57] ABSTRACT

A radiation detector of the Neher-White type which automatically neutralizes induced negative charges on the electrometer tube control grid which shut off the electrometer tube. The detector includes means for establishing a voltage of one polarity in response to plate current and voltage of opposite polarity in response to an absence of plate current and means for connecting the control grid to a reference potential for draining the negative charge in response to the voltage of opposite polarity.

9 Claims, 1 Drawing Figure

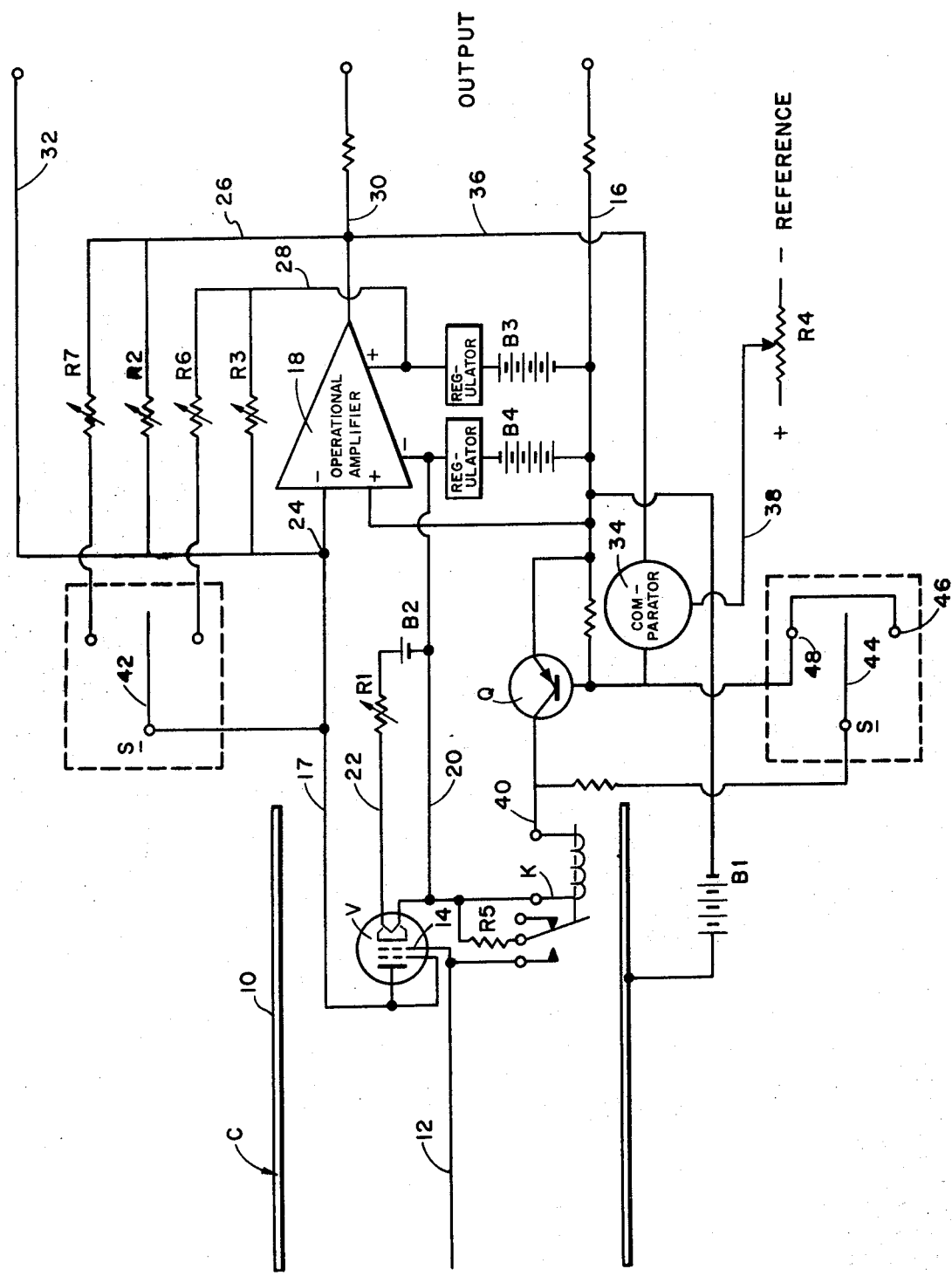

ELECTROMAGNETIC DISTURBANCE NEUTRALIZATION RADIATION DETECTOR

BACKGROUND OF THE INVENTION

The invention described herein was made in the course of under Contract AT(26-1)-410 with the U. S. Atomic Energy Commission.

This invention relates to radiation detectors, and more particularly to radiation detectors of the Neher-White type, i.e., detectors which employ an ion chamber-vacuum-tube electrometer combination wherein the control grid of the electrometer tube is connected only to one of the electrodes of the ion chamber.

Arrays of radiation detectors are frequently used to monitor the release of radioactivity from atomic energy activities such as the operation of nuclear reactors or the utilization or testing of nuclear explosives. These arrays generally consist of a number of individual radiation detectors placed around the activity being monitored with the output signals of the individual monitors conducted to a central control point through suitable cables. In one respect the Neher-White type of detector is ideally suited for such applications since its output is an electrical analog of the radiation flux which is essentially logarithmically related thereto. Accordingly, the very wide range of radiation intensities that could possible be seen by the monitoring detectors can be adequately detected by a single device at each monitoring station without the necessity of complicated arrangements for providing for scaling of the detector outputs.

However, the floating electrometer control grid configuration of the Neher-White detector renders it extremely susceptible to malfunction when the detector is subjected to electromagnetic disturbances of wave length long enough to couple inductively via the output lines into the electrometer circuit. When such electromagnetic disturbances occur, a portion of the disturbance signal is rectified thereby depositing an extraneous negative charge on the grid of the tube. A negative charge on the electrometer grid turns off the tube thereby preventing current from flowing in the plate circuit. Since there is no conductive link to the floating grid, in a very low radiation flux such a residual charge may take hours to bleed off through the high resistance of the glass envelope of the tube. In a higher radiation flux, the charge will bleed off by neutralizing some of the positive ions created in the ion chamber by the radiation flux thereby causing an inaccurate output reading.

Heretofore the solution of this problem has been to use shielded cables in the output lines in order to prevent the inductive coupling of the electromagnetic disturbances. Since in typical arrays of radiation monitors individual monitors may be placed at considerable distances from the central control point, this approach results in very high shielded cable costs which may render the use of Neher-White detectors economically prohibitive for particular applications.

In those arrays where Neher-White detectors have been used, with shielded cables providing the protection against electromagnetic disturbances, it has been quite common for a relay to have been included in each of the individual detectors. The purpose of those relays has heretofore been limited to providing the means for making remote checks on (and readjustment of) the electrical characteristics of the detector circuit against previously established calibration values, the function of the relay being to connect the electrometer control grid directly into the plate circuit upon activation by a manually operated switch.

I have discovered, however, that these relays can be utilized to neutralize the effects of electromagnetic disturbances since a connection of the electrometer grid to the plate circuit provides a drain path for a negative charge on the grid, and that, consequently, shielded cables need no be used in these detector arrays. Accordingly, my invention concerns means and method of automatically activating a relay in a Neher-White detector for providing a drain path for a negative charge deposited on the electrometer grid, thereby automatically neutralizing the effects of electromagnetic disturbances on the detector.

SUMMARY OF THE INVENTION

Accordingly, it is an object of the invention to provide a radiation detector of the Neher-White type wherein an extraneous negative charge on the grid of the electrometer tube is automatically neutralized. Briefly summarized, the above and additional objects are accomplished by automatically connecting the control grid to an appropriate reference potential for draining the extraneous charge in response to a cessation of current flow in the plate circuit of the electrometer tube. This is accomplished by establishing a voltage of one polarity in response to current flow in the plate circuit of the electrometer tube and a voltage of opposite polarity in response to an absence of current flow therein, and connecting the control grid to means for draining the negative charge thereon in response to the voltage of opposite polarity. A particular combination of circuit elements for performing these functions includes an operational amplifier in the plate circuit for establishing the voltages of one and opposite polarities and a circuit connecting the output of the operational amplifier with an integral relay in the ion chamber-electrometer tube combination with a circuit element interposed therein which passes energization current to the relay in response to the voltage of opposite polarity only.

Additional objects, advantages, and details of the invention will be more fully understood after consideration of a preferred embodiment of the invention as described below in conjunction with the drawing.

BRIEF DESCRIPTION OF THE DRAWING

The single FIGURE of drawing is a circuit diagram illustrating a preferred embodiment of an apparatus for practicing the invention.

DESCRIPTION OF A PREFERRED EMBODIMENT

Referring now to the drawing, ion chamber C is represented by outer positive electrode 10, which is usually the outer shell of the ion chamber, and central negative electrode, or collector, 12. Collector 12 is connected directly to control grid 14 of vacuum tube electrometer V, which is connected as a triode, as is generally typical in Neher-White detector arrangements. The collection potential for ion chamber C is provided by battery B1 connected to outer electrode 10 and common, or reference, lead 16. The combination of ion chamber C with integral electrometer tube V and relay K, which will be referred to later in connection with its function, are available as standard items from the Jordon Nuclear Company of Pasadena, Calif. and the Ralph White Company of Altadena, Calif. These ion chamber-electrometer tube-relay combinations have been extensively used in nuclear reactor monitoring arrays wherein shielded wires were utilized to negate the effects of electromagnetic disturbances. The utility of relay K in these applications was limited to providing a means for shorting out the electrometer control grid so that the electrical components of the detector circuit minus the ion chamber input could be subjected to calibration checks and adjustments. An example of the use of relay K in this manner will be described hereinafter.

The plate circuit for electrometer tube V includes lead 17, operational amplifier 18, the function of which will be described hereinafter, lead 20, and the cathode and plate of tube V. Cathode filament voltage and the potential between the cathode and plate of tube V are provided by the filament heater circuit which includes lead 22, adjustable resistor R1, and battery B2 in addition to lead 20. The ionization of the gas in chamber C by incident radiation and the consequent migration of positive ions to collector 12 makes control grid 14 of electrometer tube V more positive, i.e. its negative bias is reduced, thereby allowing current to flow in the plate circuit. The magnitude of that current flow is an essentially logarithmetic analog of the intensity of the ionization in chamber C.

With relay K in its deenergized posture, as shown in the drawing, collector electrode 12, and therefore control grid 14, are floating, i.e., are electrically insulated from all other circuits of the system. As indicated earlier, this floating collector-control grid of the Neher-White ion chamber-electrometer tube combination is particularly susceptible to malfunction due to the deposition and retention of negative charges on the collector-control grid. When electromagnetic disturbances of wave length long enough to couple inductively via the output lines into the electrometer circuit are experienced, a portion of the disturbance signal is rectified resulting in the deposition of a negative charge on the control grid of the tube. A negative charge on the electrometer control grid turns the tube off allowing no current to flow in the plate circuit. To negate this effect, the turned off condition of electrometer V is sensed and relay K automatically activated to provide a conductive path for bleeding off that negative charge and then deactivated to return the electrometer to normal operation. The manner in which this is accomplished will now be explained.

The output of the plate circuit is fed into summing junction, or negative terminal, 24 of operational amplifier 18 which, in accordance with well known characteristics of operational amplifiers, produces a current output equal in magnitude to, but opposite in polarity from, the input into the summing junction. The output of operational amplifier 18 is fed back to summing junction 24 through the feedback circuit including lead 26 and variable resistor R2. The magnitude of the output of the operational amplifier than increases or decreases in response to increases and decreases in the electrometer plate current to produce a zero input at summing junction 24. Variable resistor R2 is set at a value which provides a selected voltage drop across the operational amplifier when the ion chamber is subjected to a selected level of radiation thereby providing calibration of the detector. The output of the detector may be taken off as a voltage across output lead 30 and reference lead 16 or as a current across leads 30 and 32 (with, of course, the removal of R2).

A third input to summing junction 24 is from the zero adjust loop including lead 28 and variable resistor R3. Resistor R3 is set at a value which provides that positive current input (from battery B3) to summing junction 24 which will just offset the negative input from electrometer V when ion chamber C is subjected to some selected level of radiation, such as average background. Accordingly, the input into and the output from operational amplifier 18 at that selected level of radiation will be zero. When electrometer V is shut off by deposition of a negative charge on collector 12, the only input into operational amplifier 18 will be the positive current of this zero adjust loop. Accordingly, the output of the operational amplifier will be a negative current of magnitude equal to that of the zero adjust loop when tube V is shut off.

It can be seen then, that the use of operational amplifier 18 in the plate circuit provides a means for sensing the turned off condition of the electrometer since the output of the operational amplifier switches polarity in response to that turned off condition. While a preferred combination of circuit elements for utilizing this reverse in polarity of the output for energizing relay K is shown in the drawing and will be explained hereafter, it will be appreciated that the basic requirement is that the connection of the operational amplifier output to the relay be made through a circuit element which permits an energization signal to reach relay K only in response to a negative output. A diode is, of course, the simplest circuit element which meets this requirement.

It is worth noting at this point that the operational amplifier provides advantages in addition to those primarily related to providing the means for sensing the turned off condition of the tube. The operational amplifier maintains the plate of the electrometer at a virtual ground thereby insuring a constant potential between the plate and cathode of the electrometer tube regardless of the output line resistance. This improves the linearity of the detector response and makes the ability to drive the output over high impedance output lines the function of the voltage swing of the amplifier which in turn is a function of the amplifier supply voltage. Supply power is provided by series connected batteries B3 and B4 which may or may not be equal depending upon the desired symmetry of the operational amplifier output. The splitting of the supply power determines the potential of reference lead 16. Regulation of the voltage outputs of batteries B3 and B4 may be accomplished by any convenient means known in the art.

Referring now to the preferred arrangement for energizing relay K shown on the drawing, the output from operational amplifier 18 is connected to comparator 34 via lead 36 where it is compared against a reference potential which is carried over lead 38 from some convenient point in the circuit, not shown, (such as the junction of lead 20 with the regulated output from battery B4). Resistor R4 establishes the value of the comparator reference voltage. When the magnitude of the voltage output from operational amplifier 18, i.e., the input into the comparator, exceeds that reference, comparator 34 produces a constant magnitude output which is of the same polarity as its input. The output of comparator 34 is transmitted to transistor amplifier Q and when it is negative, i.e., when the electrometer V is shut off as previously explained, it is amplified and passed by transistor Q over lead 40 thereby energizing relay K. This connects collector 12-control grid 14 to lead 20 of the plate and cathode circuits through the loop including resistor R5 thereby providing a drain path for the negative charge thereon and placing the grid at cathode voltage which causes current to flow in the electrometer plate circuit. This current flow in the plate circuit adds a negative input into summing junction 24 of operational amplifier 18 thereby producing a positive output which changes the polarity of the input to comparator 34 over lead 36. Accordingly, since the output from comparator 34 is now positive, the output of transistor Q falls to zero thereby permitting relay K to return to its deenergized posture as illustrated in the drawing which, in turn, returns the detector to its normal operating mode.

Utilization of the comparator as the element which passes the energization signal to relay K provides several advantages over the use of a diode. The comparator permits the switching point to be precisely defined whereas the switching point using a diode would be dependent upon the junction potential of that particular diode, the junction potential varying from diode to diode and being subject to changes in temperature. This more precise definition of the switching point is of importance in minimizing the probability of relay K being energized in response to natural variations in incident radiation below average background (as compensated by the setting of R3). In addition, the use of the comparator enables the same switching point to be established for each of the detectors of an array of detectors.

Rapid readjustment of the electrical characteristics of the circuit to calibration values is facilitated by resistors R6 and R7 which may be selectively inserted in the circuit by manipulation of double pole, double throw switch S. As indicated earlier, resistor R2 is adjusted so that a convenient output of the operational amplifier is obtained when the ion chamber is subjected to a selected calibration intensity of radiation and resistor R3 is adjusted so that the output of the operational amplifier is zero when ion chamber C is subjected to background radiation. When these adjustments are completed, switch S is manipulated so that pole 42 places R6 in parallel with R3 and pole 44 makes contact with one of the terminals 46 or 48 to turn on transistor Q thereby energizing relay K. As long as switch S is maintained in that posture, control grid 14 of electrometer V is at cathode voltage thereby allowing a large current flow in the plate circuit essentially as a diode. R6 is then adjusted so that a convenient output voltage value is obtained across output lines 30 and 16, and that output is recorded. Switch S is then manipulated to place R7 in parallel with R2, the other terminal of the pair 46, 48 also energizing relay K. As before, R7 is adjusted to provide a convenient output which is recorded. At some later time, the electrical characteristics can be checked and readjusted, if necessary, by returning switch S to the positions just described and adjusting resistors R2 and R3 if any variance from the recorded outputs is observed.

While the fundamental novel features of the invention have now been shown and described and pointed out as applied to an embodiment particularly described, and further variations have been suggested and indicated, it will be readily appreciated by those skilled in the art that various omissions and substitutions and changes may be made within the principle and scope of the invention as expressed in the appended claims.

What is claimed is:

1. In a radiation detector of the type utilizing an ion chamber and vacuum-tube electrometer combination wherein the control grid of the electrometer tube is normally connected only to one of the electrodes of the ion chamber, a combination of electrical circuit elements which automatically remove an extraneous negative charge from said control grid comprising:

a plate circuit connected to the electrometer,
   means for establishing a voltage of one polarity with respect to a reference potential in response to current flow in said plate circuit and a voltage of opposite polarity with respect to said reference in response to a cessation of said current flow, and
   means for making a conductive connection between said control grid and a drain path for said extraneous charge in response to said opposite polarity voltage.

2. The combination of claim 1 wherein said means for establishing said voltages of one and opposite polarities include an operational amplifier the summing junction of which is connected to the plate of said electrometer and the output of which is connected to said means for making said conductive connection.

3. The combination of claim 2 wherein the input to said summing junction includes a positive polarity current equal in magnitude to the negative current input from said plate when said ion chamber is subjected to a selected level of radiation.

4. The combination of claim 3 wherein said selected level of radiation is background radiation.

5. The combination of claim 1 wherein said means for making a conductive connection between said control grid and said drain path include a relay and circuit means for passing an activation signal to said relay in response to said opposite polarity voltage.

6. The combination of claim 3 wherein said means for making said conductive connection include a relay which upon activation and deactivation connects and disconnects said control grid to and from a point in the detector circuit at an appropriate potential and circuit means which include a combination of a comparator and transistor which passes an activation signal to the relay only in response to negative output from the operational amplifier greater than a preselected magnitude.

7. A method of providing automatic neutralization of the effects of electromagnetic radiation in shutting off the electrometer of a radiation detector of the type having an ion chamber and vacuum tube electrometer combination wherein the control grid of the electrometer is normally connected only to one of the electrodes of the ion chamber and including a relay which upon activation provides a conductive path between the control grid and detector circuitry, the steps comprising establishing a voltage of one polarity with respect to a reference potential in response to normal operation of the electrometer tube, establishing a voltage of opposite polarity with respect to said reference in response to a turned off condition of the electrometer tube, and producing a signal for activating the relay in response to said voltage of opposite polarity.

8. The method of claim 7 wherein said voltage of one polarity and said voltage of opposite polarity are the output of the detector and including the step of comparing said output against a preselected reference value prior to producing said activating signal.

9. The method of claim 8 including the step of inactivating said relay in response to a turned on condition of said electrometer.

* * * * *